United States Patent [19]

Gilchrist

[11] Patent Number: 5,046,053
[45] Date of Patent: Sep. 3, 1991

[54] ACOUSTIC SIGNAL DETECTION CIRCUIT
[75] Inventor: Ian R. Gilchrist, Timonium, Md.
[73] Assignee: Cyber Scientific, Baltimore, Md.
[21] Appl. No.: 606,582
[22] Filed: Oct. 31, 1990
[51] Int. Cl.$^5$ .................... G01S 15/00; G01S 3/80; G08C 21/00
[52] U.S. Cl. .................... 367/98; 367/127; 367/900; 367/907
[58] Field of Search ............... 367/98, 900, 118, 127, 367/129, 907; 178/18, 19; 364/517; 73/900, 609

[56] References Cited

U.S. PATENT DOCUMENTS 4,315,325 2/1989 Blades .................... 367/98

Primary Examiner—Daniel T. Pihulic
Attorney, Agent, or Firm—Perman & Green

[57] ABSTRACT

An acoustic signal receiving and processing circuit provides an output signal that enables a distance to be determined between a transmitter and a sensor. The circuit comprises a sensor which receives both noise and acoustic position signals, the acoustic signals arriving after a time delay indicative of distance between the signal's transmitter and a sensor. A level control circuit provides a plurality of output potentials, one of which is a ramp signal and another is a neutral voltage, the ramp signal produced in response to a start signal manifestation. A comparator circuit, has a pair of inputs connected to the level control and sensor circuits, respectively. The comparator circuit produces a first output signal in response to a potential on one of its inputs exceeding a potential on another of its inputs, i.e. when a voltage transition of a received acoustic signal initially passes a voltage manifested by the ramp signal. A signal detection circuit is responsive to the first output signal from the comparator circuit to cause the level control circuit to apply the neutral voltage to the comparator circuit. The comparator circuit then produces a second output signal upon a subsequent transition of the received acoustic signal past the neutral voltage, resulting in a "zero crossing" detection of the received signal. A further circuit is responsive to a start signal to commence an interval manifestation and to a detection of the second output signal to terminate the interval manifestation, whereby the interval manifestation is indicative of the distance between the transmitter and sensor.

9 Claims, 4 Drawing Sheets

ACOUSTIC SIGNAL DETECTION CIRCUIT

FIELD OF THE INVENTION

This invention relates to an apparatus for locating a point in either a two-dimensional or three-dimensional space through the use of acoustic signals, and more particularly, to a circuit for reliably sensing and detecting such acoustic signals upon their arrival at receiving microphones.

BACKGROUND OF THE INVENTION

Prior art acoustic position locating systems include a variety of ultrasonic signal generating means. Some systems employ a pointer having an incorporated spark gap. The spark gap generates an acoustic signal that is propagated to orthogonally oriented, linear microphones. Other systems employ acoustic transducers that emit periodic, acoustic signals that are received by appropriately located, discrete microphones. In both such systems, circuitry is provided which measures the propagation time of the acoustic signal between the transmitter and the respective receiving microphones. The propagation time of each signal is then converted into distance to enable the location of the transmitter. An example of the latter type of ultrasonic position locating system can be found in U.S. patent application Ser. No. 07/412,885, filed Sept. 26, 1989 now U.S. Pat. No. 4,991,148 to the inventor hereof.

Detection of acoustic position determining signals has been performed using several techniques. Spark-acoustic positioning systems generally employ amplitude discrimination circuits that only become active when the sensed signal exceeds a preset amplitude. Such circuits are used in systems such as shown in Whetstone, et al. U.S. Pat. No. 3,838,212; Davis et al. U.S. Pat. No. 4,012,588; and with other spark-acoustic systems.

In Herrington et al. U.S. Pat. No. 4,654,648, a stylus emits periodic acoustic signals, and a linear array of microphones receives those signals and determines the position of the stylus by hyperbolic triangulation. In that system, point source acoustic transmitters achieve uniform acoustic transmission patterns. The Herrington et al. detection circuit includes a zero crossing detector and also a sample and hold circuit for retaining the peak amplitudes of each cycle. A time latch is responsive to a determination by zero crossing detector that a signal has been received, to latch a clock whose count was commenced when the acoustic signal was first transmitted. Once a microprocessor receives a count from each receiver and the amplitude information for each received signal, the microprocessor scales the amplitude data and locates a common amplitude point on each of the received waves by correlation. The processor then determines the difference between the arrival times of the waveforms at the different receivers and determines the position of the transmitter.

In contrast to spark-gap/amplitude discrimination receiving circuitry, correlation circuitry provides an accurate signal representation and thus is able to precisely determine the time of signal arrivals. Such circuitry is expensive, complex, and somewhat slow in operation.

Accordingly, it is an object of this invention to provide simplified circuitry for detecting a received acoustic signal and to determine therefrom, the distance of an acoustic transmitter from an acoustic receiver.

It is another object of this invention to provide an acoustic signal detection circuit that provides the signal detection accuracy of a correlation circuit, while exhibiting less complexity and cost.

SUMMARY OF THE INVENTION

An acoustic signal receiving and processing circuit provides an output signal that enables a distance to be determined between a transmitter and a sensor. The circuit comprises a sensor which receives both noise and acoustic position signals, the acoustic signals arriving after a time delay indicative of distance between the signal's transmitter and a sensor. A level control circuit provides a plurality of output potentials, one of which is a ramp signal and another is a neutral voltage, the ramp signal produced in response to a start signal manifestation. A comparator circuit, has a pair of inputs connected to the level control and sensor circuits, respectively. The comparator circuit produces a first output signal in response to a potential on one of its inputs exceeding a potential on another of its inputs, i.e. when a voltage transition of a received acoustic signal initially passes a voltage manifested by the ramp signal. A signal detection circuit is responsive to the first output signal from the comparator circuit, to cause the level control circuit to apply the neutral voltage to the comparator circuit. The comparator circuit then produces a second output signal upon a subsequent transition of the received acoustic signal past the neutral voltage resulting in "zero crossing" detection of the received signal. A further circuit is responsive to a start signal to commence an interval manifestation and to a detection of the second output signal to terminate the interval manifestation, whereby the interval manifestation is indicative of the distance between the transmitter and sensor.

DETAILED DESCRIPTION OF THE INVENTION

Figure 1:
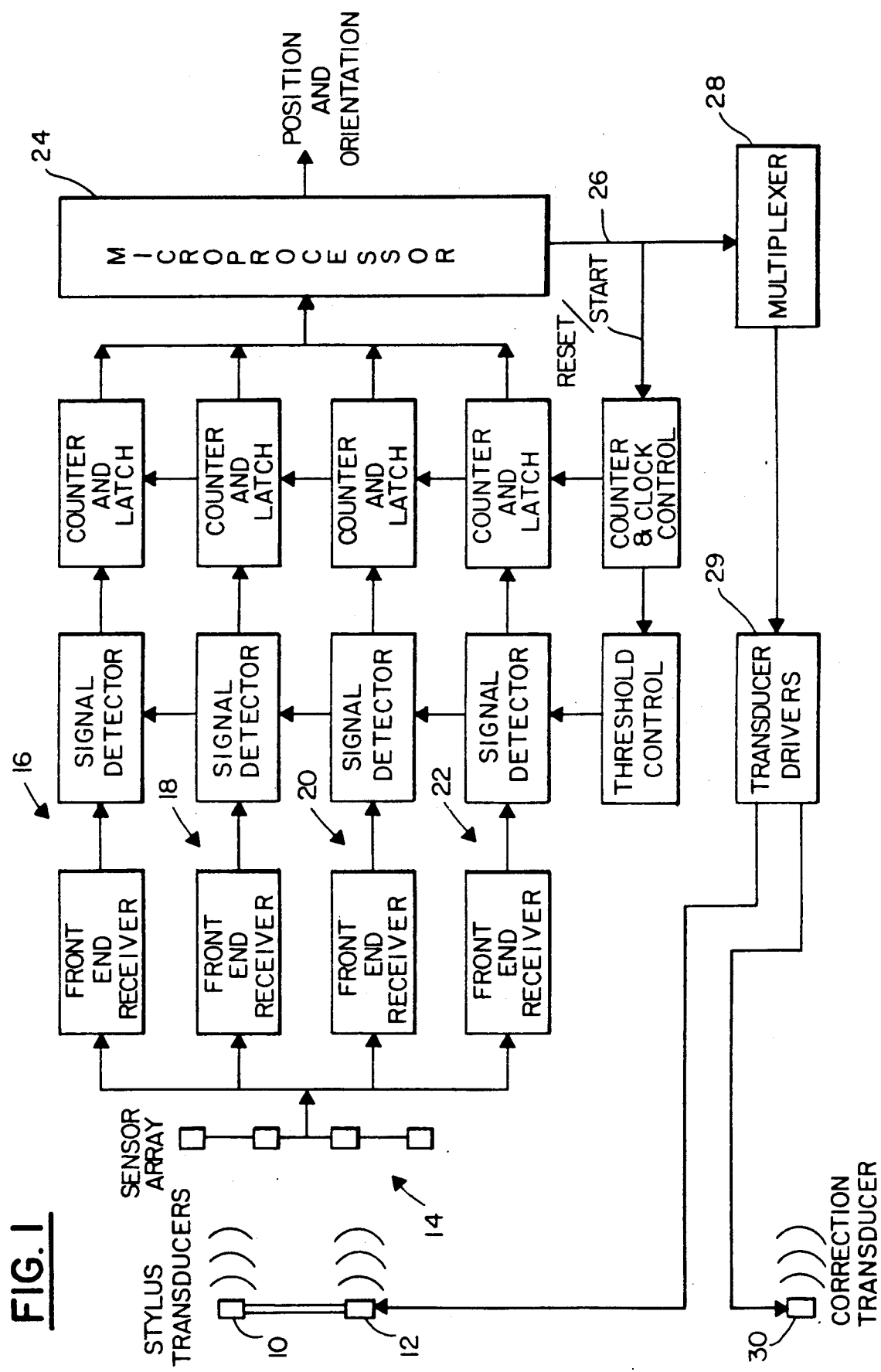
FIG. 1 is a block diagram of an acoustic position sensing system which incorporates the invention hereof.

Referring now to FIG. 1, a pair of acoustic point source transmitters 10 and 12 are alternately pulsed to generate periodic acoustic signals that are transmitted towards an array of acoustic sensors 14. Each acoustic sensor has an associated receiving/detection channel 16, 18, 20, and 22, respectively. Each such receiving/detection channel amplifies and filters a received acoustic signal from its associated sensor and applies it to a signal detection circuit where a zero crossing point is determined for the received signal.

Transmitters 10 and 12 are controlled by microprocessor 24 which issues a start command onto line 26. That command both causes an acoustic signal to be emitted from transducers 10 and 12 (via the operation of multiplexor 28 and transducer driver 29), and for counters in each of receiving/detection channels 16, 18, 20, and 22 to commence counting as a distance manifestation. When a signal detection circuit indicates that a zero crossing point has occurred, the count is latched and is provided to microprocessor 24 which, when all counts are provided, determines the position and orientation of a stylus that carries transmitters 10 and 12.

The start command on line 26 also causes multiplexer 28 to produce an output that causes a correction transducer 30 to produce an acoustic signal used for calibration purposes. The calibration portion of the circuit does not form a part of this invention.

Figure 2:
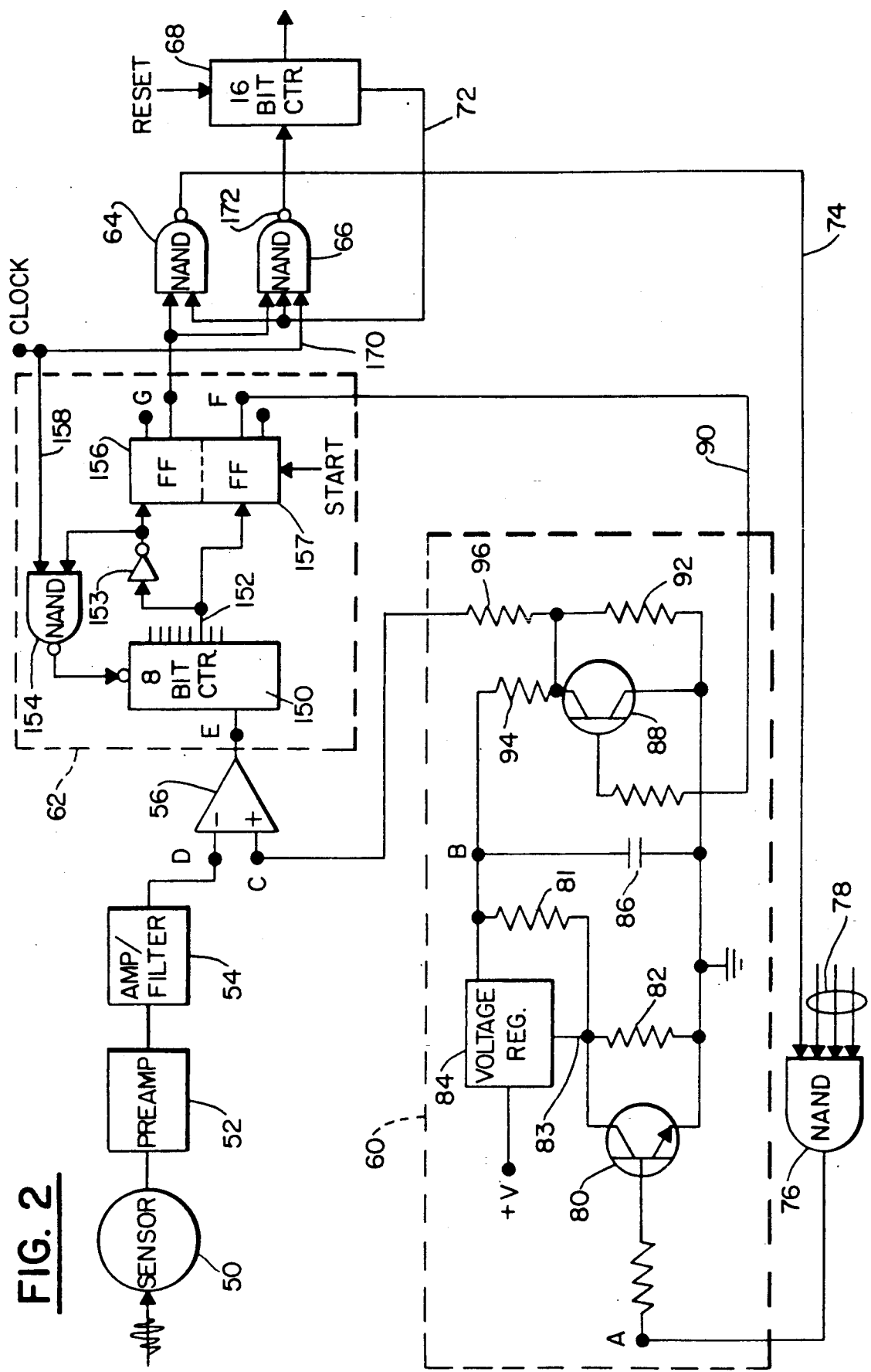
FIG. 2 is a more detailed circuit/block diagram of a portion of the system of FIG. 1.

Referring now to FIG. 2, a receiving/detection channel is illustrated in further detail. As will become apparent from the foregoing description, the receiving/detection channel employs both amplitude and zero crossing discrimination and enables an extremely accurate time determination to be made of the time of arrival of an acoustic signal. An incoming acoustic signal is first detected when it exceeds an amplitude threshold, but once so detected, the threshold discriminator is converted to a zero crossing detector. Thus, amplitude is used for the initial coarse signal detection, and frequency is used for the precise time of incidence detection of the incoming wave. This approach allows complete linearity with changing distances and avoids problems of amplitude variation with distance. To optimize signal to noise characteristics each channel is designed so that its amplitude discrimination threshold level reduces as a function of time, thereby allowing improved amplitude detection as a function of distance.

An incoming acoustic signal is detected by a sensor 50 (e.g., an electret microphone) and is then passed through a pre-amplifier 52 and amplifier/filter 54. The amplified and filtered signal is applied via terminal D to a comparator 56. Comparator 56 has another input terminal C, to which is applied a discrimination voltage from level control circuit 60. Initially, level control circuit 60 applies a voltage to terminal C that enables an amplitude discrimination signal to be generated by comparator 56 which indicates the presence of an incoming acoustic signal. Once the incoming acoustic signal is thus amplitude-detected, level control circuit 60 reduces the voltage level on terminal C to a neutral potential, at which point, comparator 56 becomes a zero crossing detector.

The output from comparator 56 is applied, via terminal E, to a signal detection circuit 62 which functions to both determine whether the signal which caused the output from comparator 56 is a noise signal or is an acoustic signal from one of transmitters 10 or 12. If the signal is determined to be a noise signal, it is ignored and the remainder of the circuit is unaffected. If the signal is determined to be an acoustic position signal, an output potential is applied via conductor 90 to level control circuit 60 that causes the level at terminal C to be reduced to a neutral level. When the input signal at terminal D crosses through the neutral or "zero" threshold level of comparator 56, an output from signal detection circuit 62 is applied via a pair of NAND circuits 64 and 66, to a 16 bit counter 68, which, in turn, provides a 16 bit count indicative of range between a transmitter 10 or 12 and sensor 50.

The detailed operation of FIG. 2 will now be described in conjunction with the waveforms shown in FIGS. 3 and 4. Initially, a reset pulse is applied to 16 bit counter 68. This causes a high output to be produced by counter 68 on line 72 which conditions the outputs of NAND circuits 64 and 66. Next, the leading edge of a start pulse (see FIG. 3) is applied to reset flip flops 156 and 157. As a result, terminal G goes high and terminal F goes low. The high level on terminal G, combined with the high level on line 72, enables output line 172 from NAND circuit 66 to follow the clock signals applied via input line 170. As a result, counter 68 commences to accumulate a range count.

The high level at terminal G, combined with the high level on line 72, also causes the output of NAND 64 to fall, thereby causing the condition of line 74 to fall to the low state. The low voltage on line 74 is applied to NAND circuit 76 which has three additional inputs 78 (one from a corresponding NAND circuit to NAND 64), in each of the other three receiving/detection channels. The levels on each of inputs 78 to NAND 76 fall simultaneously with the potential fall on line 74. As a result the output from NAND circuit 76 rises (see waveform A in FIG. 3) and transistor 80 is rendered conductive. This action shunts resistance 82 to ground and substantially reduces the output impedance across voltage regulator 84.

Prior to transistor 80 becoming conductive, the application of supply voltage $+V$ to voltage regulator 84 cause it to produce a regulated output potential at terminal B. Capacitor 86 is thereby charged to the regulated output potential. At the same time transistor 88 is biased to non-conduction by an output from signal detection circuit 62 on line 90 and applies the regulated output potential from voltage regulator 84 to the voltage divider resistors (94 and 92), and finally to terminal C of comparator 56. This potential essentially disables comparator 56 from reacting to noise signals received via sensor 50.

Voltage regulator circuit 84 is a commercially available circuit and can be obtained from the National Semiconductor Company, (i.e., designated as the LM317L, 3terminal, 100 ma, adjustable regulator). Resistors 81 and 82 provide a feedback voltage to an adjustment terminal 83 that enables voltage regulator 84 to maintain its output level at a predetermined level so long as it sees a high output impedance. When, however, its output impedance falls to a low level, it is the characteristic of such a regulator circuit that its output level falls precipitously in an attempt to maintain a minimum output current. In essence, the circuitry within the voltage regulator approaches a saturation state which cause the production of a current-limited, significantly lower output potential.

As aforestated, when transistor 80 is rendered conductive by NAND 76, the output impedance across voltage regulator 84 falls due to the shunting of resistor 82 by transistor 80. As a result, the output potential from voltage regulator 84 attempts to fall. However, the potential at terminal B only decays slowly due to the charge on capacitor 86 and its gradual discharge through resistor 81 and transistor 80. As a result, a slowly decreasing potential is applied via resistors 92, 94, and 96 to terminal C. This potential enables a gradually decreasing discrimination level to be applied to comparator 56. Thus, the farther away transmitters 10 and 12 are from sensor 50, the longer it takes for an acoustic signal to travel there-between and the greater the loss in amplitude of the signal. The decreasing level at terminal C thus compensates for such amplitude changes.

Figure 3:
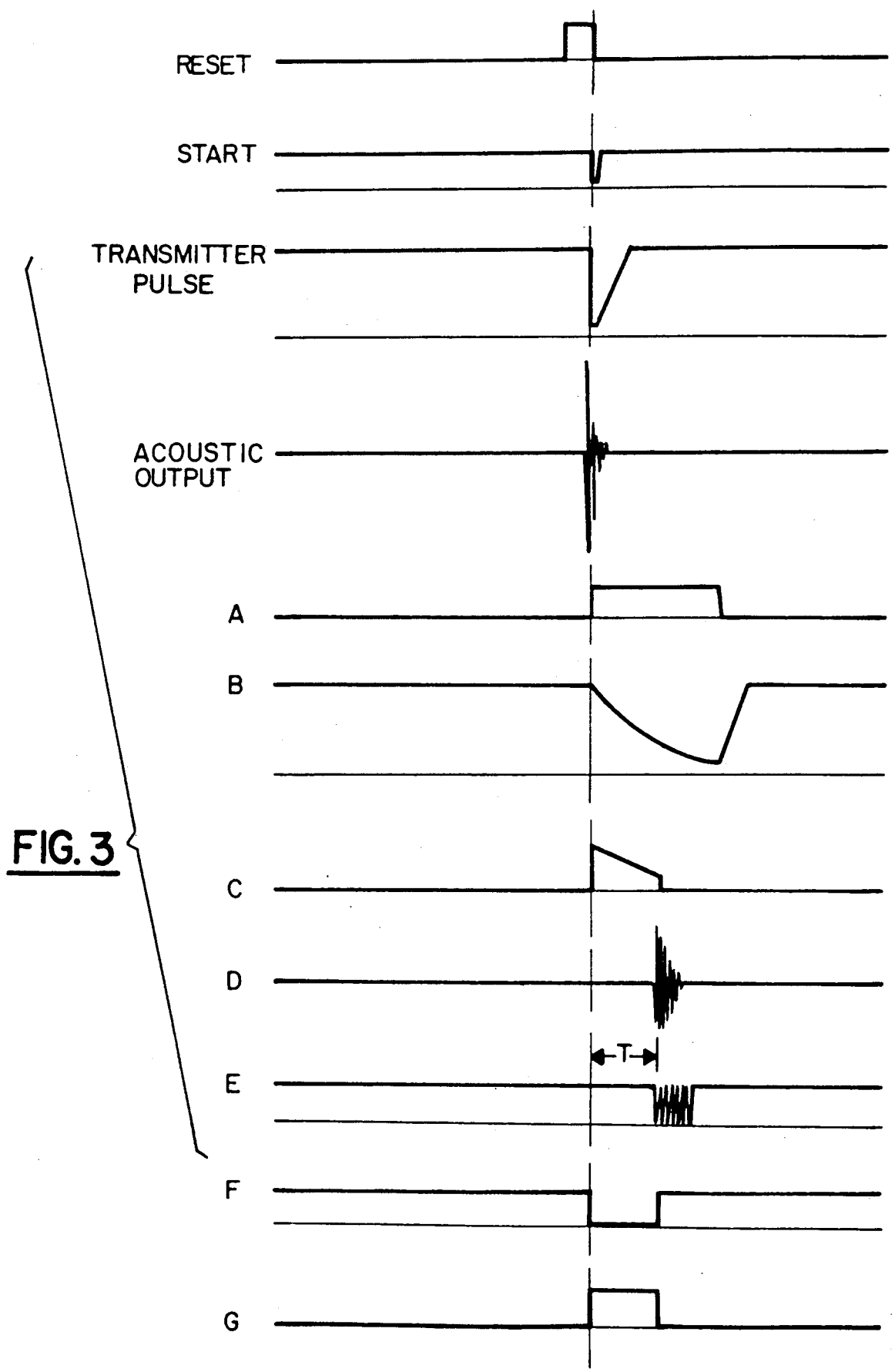
FIG. 3 illustrates a series of waveforms useful in understanding the operation of the invention.

As can be seen from the waveforms of FIG. 3, the start pulse commences several functions. It causes a pulse to be generated by transducer driver 29 (FIG. 1) which causes one of transmitters 10 or 12 to produce an acoustic output signal. It also causes: the output of NAND circuit 76 to rise and apply a high level to terminal A, the discharge of capacitor 86 to commence; and the application of a gradually decreasing potential to terminal C.

After a transit time T, the transmitted acoustic signal is detected by a sensor 50, amplified and filtered and applied to terminal D. The signal appearing at terminal D (waveform 100) is shown in larger scale as the uppermost trace in FIG. 4.

Figure 4:
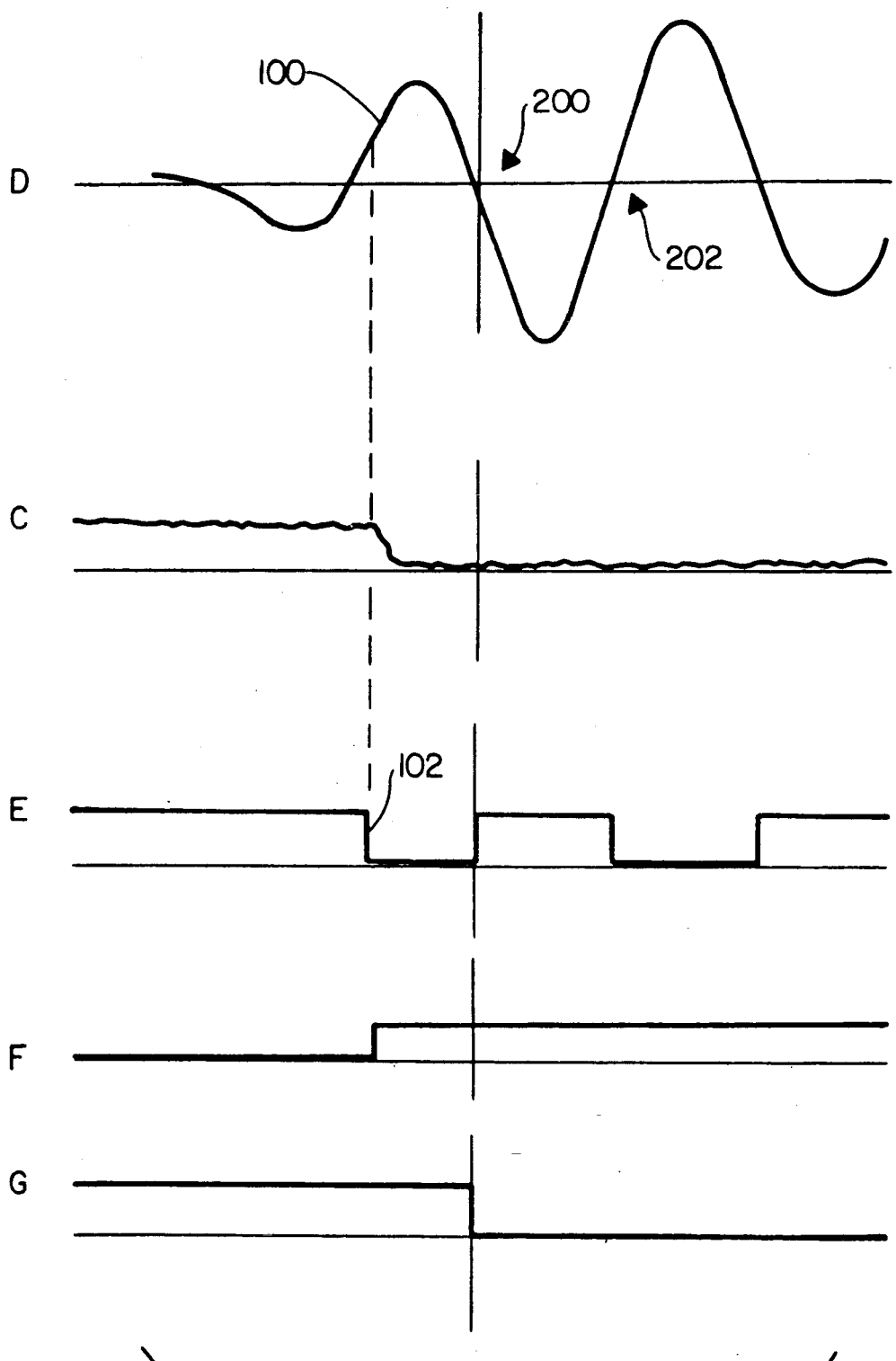
FIG. 4 are expanded traces of certain of the waveforms shown in FIG. 3.

When the voltage level of waveform 100 first passes the voltage level on terminal C, the output at terminal E of comparator 56 drops, as shown at waveform 102 in FIG. 4. The negative going transition causes 8 bit counter 150 to commence counting. It should be noted that when the potential at terminal E is in the high state, 8 bit counter is maintained in a reset state and all of its output lines (e.g., 152) are in the low state. As a result, inverter 153 produces a high state output which is applied to NAND circuit 154. Clock pulses are also applied to NAND circuit 154 and passed through to 8 bit counter 150. Nevertheless, 8 bit counter 150 does not commence counting until the potential at terminal E drops.

If a received signal is one generated by transmitters 10 or 12, counter 150 continues its count until it reaches an intermediate count (e.g. 6 out of 8). At such time, the level on output line 152 rises and causes inverter 153 to decondition NAND circuit 154 thereby terminating the count input to counter 150.

The above noted intermediate count is set so as to discriminate against short duration noise pulses. Such pulses, characteristically, exhibit a very short time duration. When such a pulse is received and its initial transition causes comparator 56 to produce a negative going output at terminal E, 8 bit counter 150 commences its count. However, the lagging edge of such a noise pulse will generally drop below the level on terminal C prior to the count of counter 150 reaching output line 152. When the potential at terminal D drops below that on terminal C, comparator 56 causes the potential at terminal E to rise and thus resets counter 150.

This action terminates any further action by detection circuit 62, and the circuit is automatically prepared for the next input signal.

Assuming a proper acoustic signal has been received, amplitude detected and determined not to be a noise pulse, comparator 56 reverts to a zero crossing detector by the action to be described hereinafter. When the count of counter 150 reaches terminal 152, a positive going transition is applied to flip flop 157 and a negative going transition is applied to flip flop 156 (through the action of inverter 153). As both flip flops 156 and 157 are set to trigger on only low to high transitions, the high to low transition applied to flip flop 156 has no effect, whereas the low to high transition applied to flip flop 157 causes it to toggle. The result is that the potential on its output terminal F rises to the high state, which state is applied via conductor 90 to the base of transistor 88, causing it to conduct and clamp terminal C to essentially a neutral or ground potential.

The next time the voltage at terminal D (see FIG. 4) falls past ground (at point 200), the voltage at terminal E transitions to the high state, causing counter 150 to be reset. As a result, the output potential on terminal 152 drops to the low state, and a low to high transition from inverter 153 triggers flip flop 156 so that its output terminal G falls to the low state. This potential fall is applied to NAND circuit 66, thereby disabling its output line 172 from following the transitions of applied clock signals (via input line 170). This action causes 16 bit counter 68 to stop the range count.

Simultaneously, the state on low level output at terminal G is applied to NAND circuit 64, thereby causing its output to rise to the high state which is applied to NAND circuit 76 via conductor 74.

When the acoustic signal at terminal D (waveform 100 in FIG. 4) again passes through ground (point 202), the output from comparator 56 transitions to the low-state and restarts counter 150. However, only the comparator output E will continue to toggle states with each zero crossing. The outputs G and F of signal detector 62 stay latched at the same states until the next start signal occurs. The resulting range count is then read out of counter 68 to a microprocessor (not shown) which converts the count to a range distance.

When each of the other receiving channels has received its signal, high voltage levels will appear on input lines 78 to NAND circuit 76 causing its output to fall to the low state. This action renders transistor 80 nonconductive and thereby impresses the impedance of resistance 82 across the output of voltage regulator 84. The increased output impedance thereby enables voltage regulator 84 to again produce the regulated output potential, which recharges capacitor 86, readying it for the next cycle.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A circuit for receiving an acoustic signal produced by a transmitter in response to a start signal, and for providing an output signal which enables a distance to be determined between said transmitter and sensor means in said circuit, said circuit comprising:

sensor means for receiving noise signals and, after a time delay, said acoustic signal from said transmitter, said time delay indicative of the distance of said transmitter from said sensor;

level control means for providing a plurality of output potentials, including a ramp voltage and a neutral voltage, said ramp voltage produced in response to said start signal manifestation;

comparator means having a pair of inputs connected to said level control means and sensor means respectively, for producing a first output signal in response to a potential on one input transitioning past a potential on another input, a first such output signal being produced when a voltage transition of said received acoustic signal passes a voltage manifested by said ramp;

signal detection means responsive to said first output signal from said comparator means to cause said level control means to apply said neutral voltage to said comparator means, whereby said comparator means produces a second output signal upon a subsequent transition of said received acoustic signal past said neutral voltage; and circuit means responsive to said start signal to commence an interval manifestation and to a subsequent detection of said second output signal to terminate said interval manifestation.

2. The circuit as defined in claim 1 wherein said signal detection means further comprises:

logic means for discriminating a noise signal from a transmitter produced acoustic signal.

3. The circuit as defined in claim 2 wherein said logic means further comprises:
a counter which commences its count in response to said first output signal and is reset when a signal from said sensor means subsequently transitions past said ramp voltage prior to a predetermined count being manifest; and
flip flop means responsive to a manifested predetermined count to cause the application of said neutral voltage to said comparator means.

4. The circuit as defined in claim 1 wherein said level control means comprises:
a voltage regulator circuit which initially provides a regulated dc output level across a high impedance load and a substantially reduced dc output level across a low impedance load;
capacitive means coupled to said voltage regulator circuit and manifesting a charged state when said regulated dc output level is present; and
first switch means responsive to said start signal to connect a low impedance load to said voltage regulator circuit and to thereby cause it to output said substantially reduced dc output level and to thereby enable the discharge of said capacitor means, whereby a gradually decreasing ramp voltage is applied to one input of said comparator means, said ramp voltage gradually decreasing a voltage level at which said first output signal is produced.

5. The circuit as defined in claim 4, further comprising:
second switch means coupled between one input of said comparator means and said capacitor means, and responsive to an output from said signal detection means indicating receipt of a first pulse of an acoustic signal, to apply said neutral voltage to said one output.

6. The circuit as defined in claim 5 wherein the capacitor means comprises a capacitor connected across an output of said voltage regulator circuit and said first switch is a transistor which shunts a portion of an output impedance across said output of said voltage regulator, in response to said start signal.

7. The circuit as defined in claim 6 wherein said second switch means is a transistor which, when conductive, applies a ground potential to one input of said comparator means.

8. The circuit as defined in claim 7 wherein said signal detection means includes counter means that generates a preset signal when a count is achieved indicating receipt of an acoustic signal produced by said transmitter.

9. The circuit as defined in claim 8 wherein said first transistor switch responds to said preset signal by becoming nonconductive and connecting a high impedance across the output of said voltage regulator circuit.

* * * * *